United States Patent [19]
Bartz et al.

[11] Patent Number: 5,372,642
[45] Date of Patent: Dec. 13, 1994

[54] USE OF CARBOXYMETHYLATED METHYL HYDROXYETHYL CELLULOSE ETHERS OR METHYL HYDROXYPROPYL CELLULOSE ETHERS

[75] Inventors: Uwe Bartz, Oestrich-Winkel; Reinhard Dönges, Bad Soden/Taunus; Heiner Klehr, Mainz, all of Germany

[73] Assignee: Hoechst Aktiengesellschaft, Frankfurt, Germany

[21] Appl. No.: 72,564

[22] Filed: Jun. 7, 1993

[30] Foreign Application Priority Data

Jun. 6, 1992 [DE] Germany .............................. 4218737

[51] Int. Cl.$^5$ ............................................. C04B 24/38
[52] U.S. Cl. .................................. 106/730; 106/795; 106/805
[58] Field of Search ....................... 106/730, 795, 805; C04B 24/38

[56] References Cited

U.S. PATENT DOCUMENTS

| 4,265,674 | 5/1981 | Debus et al. ......................... 106/805 |
| 4,707,187 | 11/1987 | Tsuda et al. ......................... 106/730 |

FOREIGN PATENT DOCUMENTS

| 0117431 | 9/1984 | European Pat. Off. . |
| 0375332 | 6/1990 | European Pat. Off. ............ 106/730 |
| 3910730 | 10/1990 | Germany . |
| 2080812 | 2/1982 | United Kingdom . |

*Primary Examiner*—Karl Group
*Assistant Examiner*—Paul Marcantoni
*Attorney, Agent, or Firm*—Connolly & Hutz

[57] ABSTRACT

The present invention relates to the use of carboxymethylated methyl hydroxyethyl cellulose ethers or methyl hydroxypropyl cellulose ethers having a $DS_{alkyl}$ from 1.0 to 2.0, a $DS_{carboxyalkyl}$ from 0.005 to 0.6 and an $MS_{hydroxyalkyl}$ from 0.05 to 1 as an additive to mixtures of hydrated lime and cement, and to the mixtures of hydrated lime and cement obtained in this way.

21 Claims, No Drawings

USE OF CARBOXYMETHYLATED METHYL HYDROXYETHYL CELLULOSE ETHERS OR METHYL HYDROXYPROPYL CELLULOSE ETHERS

DESCRIPTION

Mixtures of hydrated lime and cement are used in the building material industry for bricklaying, plastering, adhesive bonding, filling and restoring. To improve the water retention capacity, water-soluble polymers are added to the mixtures of hydrated lime and cement, whereby a loss of water from the mixtures on highly absorbent substrates before setting, and hence inadequate hardening, or cracking, of the plaster are to be prevented.

Hitherto, it was customary to add nonionic cellulose ethers, such as methylcellulose (MC), hydroxyethylcellulose (HEC), methylhydroxyethylcellulose (MHEC) or methylhydroxypropylcellulose (MHPC), as water-soluble polymers.

However, the effect of the abovementioned cellulose ethers on the water retention capacity with mixtures of hydrated lime and cement is ensured only at temperatures of less than 30° C.; higher temperatures—such as are encountered fairly frequently in central European latitudes and regularly in tropical latitudes—lead to a troublesome decrease in the water retention capacity.

DE-A-3,910,730 has disclosed the use of carboxymethylated methyl hydroxyethyl cellulose ethers or methyl hydroxypropyl cellulose ethers as an additive to gypsum mixtures.

It is the object of the invention to achieve an improvement in the water retention capacity of mixtures of hydrated lime and cement at temperatures of 30° C. and higher.

In spite of the high calcium ion concentration in mixtures of hydrated lime and cement and the known sensitivity of cellulose ethers carrying carboxymethyl groups to calcium ions, it has been found, surprisingly, that this object is achieved by the use of carboxymethylated methyl hydroxyethyl cellulose ethers and methyl hydroxypropyl cellulose ethers having the specifications given below.

The invention relates to the use of carboxymethylated methyl hydroxyethyl cellulose ethers and methyl hydroxypropyl cellulose ethers having a $DS_{alkyl}$ from 1.0 to 2.0, a $DS_{carboxylalkyl}$ from 0.005 to 0.6 and an $MS_{hydroxyalkyl}$ from 0.05 to 1 as an additive to mixtures of hydrated lime and cement.

According to an advantageous embodiment of the invention, the carboxymethylated methyl hydroxyethyl cellulose ethers and methyl hydroxypropyl cellulose ethers have the following degrees of substitution: $DS_{alkyl}$ 1.3 to 1.9, $DS_{carboxyalkyl}$ 0.01 to 0.1 and $MS_{hydroxyalkyl}$ 0.05 to 0.4.

The degree of substitution is a criterion for characterizing cellulose ethers. Per anhydroglucose unit three hydroxyl groups are available for the etherification and the degree of substitution (DS) can accordingly reach a maximum of 3. In hydroxyalkylation the number of reactive centres does not decrease, since the hydroxy groups of the substituents become available for further etherification.

The molar degree of substitution indicates the total number of ether groups formed per anhydroglucose unit, thus also includes side chain formation and may take on any value. Since the degrees of substitution defined in this way are always average values, the resultant values are usually fractions. The degree of methyl and carboxymethyl substitution are given as DS and the degree of hydroxyethyl and hydroxypropyl substitution as MS.

Preferably, the carboxymethylated methyl hydroxyethyl cellulose ethers and methyl hydroxypropyl cellulose ethers to be used according to the invention have viscosities from 100 to 300,000 mPas (according to Höppler, 2% aqueous solution, 20° C.). According to the invention, the carboxymethylated methyl hydroxyethyl cellulose ethers or methyl hydroxypropyl cellulose ethers are employed in a quantity from 0.001 to 5% by weight, relative to the dry weight of the mixture. Usually, the carboxymethylated methyl hydroxyethyl cellulose ethers and methyl hydroxypropyl cellulose ethers to be used according to the invention are employed in particle sizes of about 200 μm or less. Granules having a grain size of up to 700 μm are also used.

The invention also relates to mixtures of hydrated lime and cement, which are obtainable by the use of carboxymethylated methyl hydroxyethyl cellulose ethers or methyl hydroxypropyl cellulose ethers having the abovementioned specifications.

The mixtures of hydrated lime and cement can, furthermore, contain customary auxiliaries and/or modifiers.

Typical examples of auxiliaries are hydrocolloids, air-entraining agents, plastic dispersion powders, waterproofing agents, swelling agents, fillers and light-weight additives, and also plasticizers as well as retarders or accelerators.

Typical examples of modifiers are starch, starch ethers and polyacrylamides.

It is also conceivable to use the abovementioned nonionic cellulose ethers.

Typical fillers are quartz sand or limestone sand, or powders thereof (particle size: 5 μm-5 mm).

The abovementioned auxiliaries are known to those skilled in the field of mixtures, concerned here, of hydrated lime and cement.

The hydrated lime mixtures usually have the following composition:
95-19.999% by weight quartz sand, limestone sand and/or powders thereof
5-80% by weight hydrated lime
0.001-5% by weight cellulose ethers
0-10% by weight plastic dispersion powders
0-5% by weight light-weight additives
0-1% by weight waterproofing agents
0-0.5% by weight starch ethers
0-0.1% by weight air-entraining agents The cement mixtures usually have the following composition:
95-0% by weight quartz sand, limestone sand and/or powders thereof
5-99.999% by weight cement
0.001-5% by weight cellulose ethers The mixtures of hydrated lime and cement usually have the following composition:
95-19.889% by weight quartz sand, limestone sand and/or powders thereof
0.11-80% by weight cement
0.11-80% by weight hydrated lime
0.001-5% by weight cellulose ethers The auxiliaries mentioned above for the hydrated lime mixtures can also be used for cement mixtures and mixtures of hydrated lime and cement. Preferably, 3–40% by weight, particularly preferably 10–30% by weight, of cement are used in the cement mixtures and mixtures of hydrated lime and cement, and preferably 3 to 30% by weight, particularly preferably 10–20% by weight, of hydrated lime are used in the hydrated lime mixtures and mixtures of hydrated lime and cement.

The invention is explained in more detail below by reference to preferred illustrative examples and comparison examples.

The percentage data relates to percent by weight.

The quantities employed and the increase in the flocculation temperature effected by the anionic substitution can be seen from the particular relevant tables. The flocculation temperature is understood as the temperature at which a 1% solution of the cellulose ether still shows 50% of the transparency measured at room temperature.

Preparation example:

Preparation of methylhydroxyethylcarboxymethylcellulose (MHECMC)

162 g of ground cellulose pulp are alkalized in a Lödige mixer with a solution of caustic soda in 200 ml of water. A solution of sodium monochloroacetate is then added within 5 minutes, and mixing is continued for 15 minutes. After the mixture has been transferred into a pressureresistant stirred vessel, the latter is evacuated and blanketed with nitrogen, a mixture of 1260 g of methyl chloride and 22 g of ethylene oxide is injected, and the etherification is carried out at a temperature of 80 to 90° C. for a period of 60 minutes. The product obtained is washed with hot water until largely saltfree, dried and finely ground for the application test. Products which are soluble in hot water are washed with 80% by weight aqueous isopropanol.

Table 1 shows the characteristic data of the methyl hydroxyethyl cellulose ethers (comparison) and of the carboxymethylated derivatives prepared.

Preparation of methyl hydroxyethyl carboxymethyl cellulose ether (MHECMC)

3000 g of spruce pulp are suspended in a reaction mixer with 17 l of 95% dimethylglycol. After blanketing with nitrogen, the suspension is alkalized with 50% sodium hydroxide solution (I), sodium monochloroacetate or 80% monochloroacetate acid, if desired, are mixed in, ethylene oxide is metered in and the etherification is carried out for 60 minutes at 80° to 90° C. After addition of a second portion of concentrated sodium hydroxide solution (II), a reaction with methyl chloride is carried out for 60 minutes at 100° C. The suspending agent is then distilled off and the product is washed once with water at about 95° C. and then rinsed with 80% aqueous isopropanol. Table 2 gives the characteristic data of the methyl hydroxyethyl cellulose ether (comparison) and of the carboxymethylated derivatives prepared.

Preparation of methyl hydroxypropyl carboxymethyl cellulose ether (MHPCMC)

3000 g of spruce pulp are suspended in a reaction mixer with 17 l of 95% dimethylglycol. After blanketing with nitrogen, the suspension is alkalized with 50% sodium hydroxide solution, 80% monochloroacetate acid is mixed in, propylene oxide is metered in, and the etherification is carried out for 60 minutes at 80° to 90° C. After addition of a second portion of concentrated sodium hydroxide solution, a reaction with methyl chloride is carried out for 60 minutes at 100° C. The suspending agent is then distilled off and the product is washed once with water at about 95° C. and then rinsed with 80% aqueous isopropanol.

Table 3 gives the characteristic data of the methyl hydroxypropyl cellulose ether (comparison) and of the carboxymethylated derivatives prepared.

The water retention capacity (WRV) of the mixtures of hydrated lime and cement according to the invention and of the mixtures of hydrated lime and cement used for comparison purposes was determined, if desired, analogously to DIN 18 555, part 7 (testing of mortars with mineral binders), and analogously to ASTM C 91, as follows:

DIN 18 555, part 7:

Defined quantities of carboxymethylated methyl hydroxyethyl cellulose ethers or methyl hydroxypropyl cellulose ethers are added to 500 g of base mixture of hydrated lime or cement. The mixtures obtained are stirred within 15 seconds into the required quantity of water at 20° C., and stirring by means of a mortar mixer at moderate speed is then continued for about 30 seconds. Water is added until the fresh mortar prepared has a consistency which corresponds to a slump of 170±5 mm (DIN 18555, parts 2 and 8). For determining the water retention capacity, a plastic ring is used which has an internal diameter of 140 mm and a height of 12 mm and rests on a cellulose pulp card (cut to 190×190 mm, made by Schleicher & Schüll, No. 2727). Between the plastic ring and the cellulose pulp card, there is a fiber nonwoven (diameter 185 mm, made by Schleicher & Schüll, No. 0980). For the actual measurement step, about 150 g of the mixture of hydrated lime or cement is filled immediately after the stirring described above into the plastic ring within 5 seconds. The supernatant mass of hydrated lime or cement is stripped off using a trowel; the quantity present in the ring is determined accurately by weighing. Within an absorption time of 5 minutes, the cellulose pulp card extracts water from the mass; the precise quantity is determined by reweighing the moist card. The fiber nonwoven serves only the purpose of enabling the mass of hydrated lime and/or cement to be taken off more readily from the card after an absorption time of 5 minutes. The water retention capacity is defined as the percentage fraction of the remaining quantity of water relative to the total quantity at the start of the test.

ASTM C 91:

In this case, water is removed from the building material mixtures prepared by means of a vacuum. The dry mortar is stirred up in a laboratory mixer with a predetermined quantity of water. Using the mixed fresh mortar, a suction filter is filled and subjected to a vacuum (cement plaster: differential pressure 6700 Pa, 15 minutes; tile adhesive: vacuum 8000 Pa, 3 minutes).

The water retention capacity is defined as the percentage content of the remaining quantity of water relative to the total quantity of water at the start of the test.

Table 4 shows the composition of the building material mixtures used (parts by weight) and the characteristic data of the cellulose ethers used for comparative purposes.

The air-entraining agent used is *Hostapur OSB (sodium olefinsulfonate).

The starch ether has the following characteristic data: hydroxypropyl starch, $MS_{hydroxypropyl}$: 0.5, particle fineness: <200 μm, viscosity: 20 mPas (2% solution, Hoppler viscometer, 20° C.).

The waterproofing agent used is zinc stearate.

The plastic dispersion powder used is *Mowilith DM 200p.

Tables 5 to 7 show the water retention capacity of the cellulose ethers (MHECMC and MHPCMC) used in the building material mixtures.

The water retention capacity is tested at 20° C. and at 40° C. At the higher temperature, both the working apparatus, the dry mixture and also the making-up water were heated to 40° C.

The symbols are defined as follows:

NaMCA = Sodium monochloroacetate
MCE = Monochloroacetic acid
EO = Ethylene oxide
MeCl = Methyl chloride
M = Methyl
HE = Hydroxyethyl
CM = Na-carboxymethyl
MS = Molar degree of substitution
DS = Average degree of substitution
Δ WRV = Decrease in water retention capacity with a temperature increase from 20° to 40° C., in percentage points.

TABLE 1

| Ex. No. | Quantity employed NaOH (g) | Quantity employed NaMCA (g) | Degree of substitution M | Degree of substitution HE | Degree of substitution CM | Salt content (%) | Viscosity (mpas) (2%) | Flocculation temperature (°C.) |
|---|---|---|---|---|---|---|---|---|
| 1 | 100 | 2.92 | 1.44 | 0.16 | 0.011 | 0.1 | 39,000 | 83 |
| 2 | 112 | 2.92 | 1.52 | 0.12 | 0.006 | 0.2 | 82,000 | 80 |
| 3 | 134 | 2.92 | 1.71 | 0.14 | 0.014 | 0.2 | 16,000 | 90 |
| 4 | 144 | 2.92 | 1.79 | 0.12 | 0.010 | 0.4 | 27,000 | 88 |
| 5 | 154 | 2.91 | 1.88 | 0.12 | 0.009 | 0.0 | 40,000 | 80 |
| 6 | 155 | 2.91 | 1.79 | 0.12 | 0.009 | 0.0 | 55,000 | 80 |
| 7 | 112 | 5.83 | 1.59 | 0.13 | 0.012 | 0.3 | 53,000 | 85 |
| 8 | 124 | 5.83 | 1.63 | 0.14 | 0.021 | 0.3 | 34,000 | >100 |
| 9 | 134 | 5.83 | 1.67 | 0.13 | 0.026 | 0.2 | 14,000 | >100 |
| 10 | 144 | 5.83 | 1.75 | 0.12 | 0.023 | 0.2 | 36,000 | 98 |
| 11 | 144 | 5.83 | 1.83 | 0.13 | 0.032 | 1.2 | 41,000 | 99 |
| 12 | 144 | 5.83 | 1.79 | 0.12 | 0.020 | 0.7 | >100,000 | 90 |
| 13 | 154 | 5.83 | 1.88 | 0.12 | 0.037 | 0.8 | >100,000 | 93 |
| 14 | 100 | 5.83 | 1.41 | 0.12 | 0.012 | 0.1 | 43,000 | 84 |
| 15 | 156 | 5.83 | 1.90 | 0.12 | 0.020 | 0.0 | >100,000 | 87 |
| 16 | 158 | 11.70 | 1.88 | 0.12 | 0.033 | 1.0 | >100,000 | 93 |
| 17 | 154 | 14.70 | 1.80 | 0.13 | 0.050 | 0.0 | >100,000 | 98 |
| Comp. Ex. No. | | | | | | | | |
| 1 | 154 | | 1.80 | 0.12 | — | | 25,000 | 68 |
| 2 | 154 | | 1.74 | 0.12 | — | 0.1 | 21,000 | 67 |

TABLE 2

| Ex. No. | Quantity employed (g) NaOH I | Quantity employed (g) NaOH II | * # | Quantity employed (g) NaMCA MCE | Quantity employed (g) EO | Quantity employed (g) MeCl | Degree of substitution M | Degree of substitution HE | Degree of substitution CM | Salt content (%) | Viscosity (mPas) (1%) | Flocculation temp. (°C.) |
|---|---|---|---|---|---|---|---|---|---|---|---|---|
| 18 | 1450 | 2900 | * | 105 | 237 | 2722 | 1.67 | 0.25 | 0.036 | 0.8 | 5600 | >100 |
| 19 | 1450 | 2900 | * | 105 | 237 | 2722 | 1.67 | 0.25 | 0.036 | 4.6 | 3000 | >100 |
| 20 | 1524 | 3194 | # | 106 | 119 | 2900 | 1.67 | 0.11 | 0.034 | 0.4 | 5700 | >100 |
| 21 | 1524 | 3194 | # | 106 | 119 | 2900 | 1.67 | 0.11 | 0.034 | 1.8 | 2000 | >100 |
| 22 | 1600 | 3200 | # | 106 | 237 | 2900 | 1.59 | 0.21 | 0.028 | 0.4 | 3800 | 99 |
| 23 | 1600 | 3200 | # | 106 | 237 | 2900 | 1.59 | 0.21 | 0.028 | 3.4 | 1900 | 92 |
| Comp. Ex. No. 3 | 1450 | 2680 | | | 320 | 2580 | 1.74 | 0.33 | | 0.2 | 1600 | 77 |

TABLE 3

| Ex. No. | Quantity employed (g) NaOH I | Quantity employed (g) NaOH II | MCE | PO | MeCl | Degree of substitution M | Degree of substitution HP | Degree of substitution CM | Salt content (%) | Viscosity (1%) | Flocculation temp. (°C.) |
|---|---|---|---|---|---|---|---|---|---|---|---|
| 24 | 1600 | 2900 | 106 | 313 | 2722 | 1.62 | 0.11 | 0.033 | 0.1 | 3000 | >100 |
| 25 | 1600 | 2900 | 106 | 313 | 2722 | 1.62 | 0.11 | 0.033 | 3.8 | 2800 | >100 |
| 26 | 1670 | 3200 | 159 | 313 | 2900 | 1.73 | 0.12 | 0.045 | 0.4 | 2700 | >100 |
| 27 | 1670 | 3200 | 159 | 313 | 2900 | 1.73 | 0.12 | 0.045 | 5.4 | 2100 | >100 |
| Comp. Ex. No. 4 | 1450 | 2900 | — | 313 | 2722 | 1.66 | 0.13 | | 0.3 | 4300 | 70 |

TABLE 4

Composition of the building material mixtures used

TABLE 4-continued (parts by weight)

| Components | Tile adhesive/ building adhesive | Lime/cement plaster | Reinforcing cement plaster |
|---|---|---|---|
| Hydrated lime | — | 5 | 3 |
| Portland cement | 40 | 13 | 15 |
| Lime sandstone | — | 40 | 9 |
| Quartz sand | 60 | 40 | 73 |
| Perlite | — | 2 | — |
| Cellulose ether | 0.6 | 0.2 | 0.10–0.12 |
| Air-entraining agent | — | 0.015 | 0.01 |
| Starch ether | 0.05 | 0.02 | 0.02 |
| Waterproofing agent | — | — | 0.3 |
| Plastic dispersion powder | 1.5 | — | — |
| Water | 30 | 22 | 20 |

Characteristic data of the cellulose ethers used for comparison purposes

| Comparison Example No. | Type of ether | MS HE/HP | DS M | Viscosity (mpas) (2%) |
|---|---|---|---|---|
| 5 | MHEC | 0.13 | 1.5 | 60,000 |
| 6 | MHEC | 0.10 | 1.8 | 30,000 |
| 7 | MHEC | 0.22 | 1.5 | 60,000 |
| 8 | MHPC | 0.16 | 1.5 | 40,000 |

TABLE 5

Water retention capacity (WRV) in the tile adhesive/building adhesive (tested according to ASTM C 91)

| Type of ether | WRV (%) | | |
|---|---|---|---|
| | 20° C. | 40° C. | Δ WRV |
| Example No. | | | |
| 11 MHECMC | 99.6 | 99.2 | 0.4 |
| 26 MHPCMC | 99.7 | 99.1 | 0.6 |
| Comp Ex. No. 5 MHEC | 99.2 | 86.1 | 13.1 |

TABLE 6

Water retention capacity (WRV) in lime/cement plaster (tested according to DIN 18 555, part 7)

| Type of ether | WRV (%) | | |
|---|---|---|---|
| | 20° C. | 40° C. | Δ WRV |
| Example No. | | | |
| 11 MHECMC | 95.5 | 93.7 | 1.8 |
| 26 MHPCMC | 96.4 | 95.2 | 1.2 |
| 22 MHECMC | 97.6 | 96.8 | 0.8 |
| Comp Ex. No. | | | |
| 4 MHPC | 96.5 | 87.2 | 9.3 |
| 7 MHEC | 95.7 | 92.1 | 5.6 |

TABLE 7

Water retention capacity (WRV) in reinforcing cement plaster (tested according to ASTM C 91)

| | | WVR (%) | | |
|---|---|---|---|---|
| | | 20° C. | 40° C. | Δ WRV |
| Example No. | | | | |
| 1 | MHECMC | 98.7 | 94.4 | 4.3 |
| 2 | MHECMC | 94.8 | 94.7 | 0.1 |
| 3 | MHECMC | 91.6 | 91.5 | 0.1 |
| 8 | MHECMC | 94.2 | 93.6 | 0.6 |
| 10 | MHECMC | 95.5 | 95.5 | 0 |
| 11 | MHECMC | 97.5 | 97.2 | 0.3 |
| 12 | KHECMC | 98.9 | 98.8 | 0.1 |

TABLE 7-continued

Water retention capacity (WRV) in reinforcing cement plaster (tested according to ASTM C 91)

| | | WVR (%) | | |
|---|---|---|---|---|
| | | 20° C. | 40° C. | Δ WRV |
| 18 | MHECMC | 98.7 | 98.4 | 0.3 |
| 20 | MHECMC | 99.0 | 97.7 | 1.3 |
| 22 | MHECMC | 95.7 | 95.0 | 0.7 |
| 24 | MHPCMC | 98.5 | 95.2 | 3.3 |
| 26 | MHPCMC | 97.4 | 96.3 | 1.1 |
| 27 | MHPCMC | 96.9 | 96.1 | 0.8 |
| Comp. Ex. No. | | | | |
| 5 | MHEC | 98.9 | 89.4 | 9.4 |
| 6 | MHEC | 94.7 | 87.5 | 7.2 |
| 7 | MHEC | 98.4 | 93.7 | 4.7 |
| 8 | MHPC | 96.4 | 91.4 | 5.0 |

We claim:

1. A composition comprising hydrated lime or cement or hydrated lime and cement and a carboxymethylated methyl hydroxyethyl cellulose ether or a carboxymethylated methyl hydroxypropyl cellulose ether or a carboxymethylated methyl hydroxyethyl cellulose ether and a carboxymethylated methyl hydroxypropyl cellulose ether wherein said carboxymethylated cellulose ethers are present in a quantity from 0.001 to 5% by weight, relative to the dry weight of the mixture of hydrated lime and/or cement and have a degree of substitution ($DS_{alkyl}$) from 1.0 to 2.0, a degree of substitution ($DS_{carboxyalkyl}$) from 0.005 to 0.6 and a molar substitution ($MS_{hydroxyalkyl}$) from 0.05 to 1.0.

2. The composition as claimed in claim 1, wherein the carboxymethylated cellulose ethers have a $DS_{alkyl}$ from 1.3 to 1.9, a $DS_{carboxyalkyl}$ from 0.01 to 0.1 and a $MS_{hydroxyalkyl}$ from 0.05 to 0.4.

3. The composition as claimed in claim 1, wherein the carboxymethylated cellulose ethers have a viscosity from 100 to 300,000 mPas (according to Höppler, 2% aqueous solution, 20° C.).

4. The composition as claimed in claim 1, wherein the carboxymethylated cellulose ethers are present in a quantity from 0.05 to 1% by weight, relative to the dry weight of hydrated lime and/or cement.

5. A method for improving the water retention of a hydrated lime or cement composition useful in the building material industry, comprising: introducing into said composition an effective amount of a carboxymethylated methyl hydroxyethyl cellulose ether or a carboxymethylated methyl hydroxypropyl cellulose ether or a carboxymethylated methyl hydroxyethylcellulose ether and a carboxymethylated methyl hydroxypropyl cellulose ether whereby said carboxymethylated cellulose ethers are present in a quantity from 0.001 to 5% by weight, relative to the dry weight of hydrated lime and/or cement and have a degree of substitution ($DS_{alkyl}$) from 1.0 to 2.0 a degree of substitution ($DS_{carboxyalkyl}$) from 0.005 to 0.6 and a molar substitution ($MS_{hydroxyalkyl}$) from 0.005 to 1.0.

6. A method as claimed in claim 5, whereby the carboxymethylated cellulose ethers have a $DS_{alkyl}$ from 1.3 to 1.9, a $DS_{carboxyalkyl}$ from 0.01 to 0.1 and a $MS_{hydroxyalkyl}$ from 0.05 to 0.4.

7. A method as claimed in claim 5, whereby the carboxymethylated cellulose ethers have a viscosity from 100 to 300,000 mPas (according to Höppler, 2% aqueous solution, 20° C.).

8. A method as claimed in claim 5, whereby the carboxymethylated cellulose ethers are introduced in a quantity from 0.05 to 1% by weight, relative to the dry weight of hydrated lime and/or cement.

9. The composition as claimed in claim 1, wherein the carboxymethylated methylhydroxyethyl cellulose ethers and methylhydroxypropyl cellulose ethers have a particle size of about 200 μm or less.

10. The composition as claimed in claim 5, wherein the carboxymethylated methylhydroxyethyl cellulose ethers and methylhydroxypropyl cellulose ethers have a particle size of about 200 μm or less.

11. The composition as claimed in claim 1, wherein the composition comprises:
   95–19.999% by weight quartz sand, limestone sand and/or powders thereof
   5–80% by weight hydrated lime
   0.001–5% by weight cellulose ethers
   0–10% by weight plastic dispersion powders
   0–5% by weight light-weight additives
   0–1% by weight waterproofing agents
   0–0.5% by weight starch ethers
   0–0.1% by weight air-entraining agents.

12. The composition as claimed in claim 1, wherein the composition comprises:
   95–0% by weight quartz sand, limestone sand and/or powders thereof
   5–99.999% by weight cement
   0.001–5% by weight cellulose ethers.

13. The composition as claimed in claim 1, wherein the composition comprises:
   95–19.889% by weight quartz sand, limestone sand and/or powders thereof
   0.11–80% by weight cement
   0.11–80% by weight hydrated lime
   0.001–5% by weight cellulose ethers.

14. The composition as claimed in claim 1, further comprising
   (a) auxiliaries which are selected from the group consisting of hydrocolloids, air-entraining agents, plastic dispersion powders, water proofing agents, swelling agents, light weight additives, plasticizers, retarders and accelerators or
   (b) modifiers which are selected from the group consisting of starch, starch ethers and polyacrylamides.

15. The composition as claimed in claim 6, further comprising
   (a) auxiliaries which are selected from the group consisting of hydrocolloids, air-entraining agents, plastic dispersion powders, water proofing agents, swelling agents, light weight additives, plasticizers, retarders and accelerators or
   (b) modifiers which are selected from the group consisting of starch, starch ethers and polyacrylamides.

16. The composition as claimed in claim 14, wherein said cement is present in a quantity from 3 to 40% by weight of the total composition.

17. The composition as claimed in claim 16, wherein cement is present in an amount from 10 to 30% by weight.

18. The composition as claimed in claim 13, wherein said hydrated lime is present in a quantity from 3 to 30% by weight of the total composition.

19. The composition as claimed in claim 18, wherein said hydrated lime is present in an amount from 10 to 20% by weight.

20. The composition as claimed in claim 1, further comprising
   (a) auxiliaries which are selected from the group consisting of hydrocolloids, air-entraining agents, plastic dispersion powders, water proofing agents, swelling agents, fillers, plasticizers, retarders and accelerators or
   (b) modifiers which are selected from the group consisting of starch, starch ethers and polyacrylamides.

21. The composition as claimed in claim 5, further comprising
   (a) auxiliaries which are selected from the group consisting of hydrocolloids, air-entraining agents, plastic dispersion powders, water proofing agents, swelling agents, fillers, plasticizers, retarders and accelerators or
   (b) modifiers which are selected from the group consisting of starch, starch ethers and polyacrylamides.

* * * * *